United States Patent [19]

Kolthoff et al.

[11] 4,331,208
[45] May 25, 1982

[54] HYDROMECHANICAL STEERING DIFFERENTIAL

[75] Inventors: C. Paul Kolthoff, Naperville; Joachim Horsch, Lombard; John W. Gaines, Wheaton, all of Ill.

[73] Assignee: International Harvester Co., Chicago, Ill.

[21] Appl. No.: 129,160

[22] Filed: Mar. 10, 1980

[51] Int. Cl.³ .............................................. B62D 11/02
[52] U.S. Cl. ...................................... 180/6.2; 74/687; 74/710.5; 180/6.48; 180/6.5
[58] Field of Search ........................ 180/6.44, 6.2, 6.28, 180/6.3, 6.48, 6.5; 74/710.5, 687; 192/21

[56] References Cited

U.S. PATENT DOCUMENTS

| | | | |
|---|---|---|---|
| 2,336,911 | 12/1943 | Zimmermann | 180/6.44 |
| 2,353,554 | 7/1944 | Gates | 74/710.5 |
| 2,377,354 | 6/1945 | Merritt | 180/9.2 |
| 3,461,744 | 8/1969 | Booth | 180/6.44 |

FOREIGN PATENT DOCUMENTS 897850 5/1962 United Kingdom ................. 180/6.2

Primary Examiner—David M. Mitchell
Attorney, Agent, or Firm—J. W. Gaines; F. D. Au Buchon

[57] ABSTRACT

Crawler tractor adapted for stepless hydromechanical steering by driving. The power train terminates in a novel hydromechanical steering differential delivering its output to an oppositely extending pair of axles at the sides of the tractor, and forced by a differential lock in a straight line locked, primary steering condition thereof to drive the axles at a mechanically fixed 1:1 drive ratio therebetween and, secondarily, forced into differentiating by a variable displacement crossfeeding pair of axle-interconnecting hydrostatic pump/motor units during all turns so as to selectively drive either axle only at some hydrostatically fixed reduction drive ratio to the other.

21 Claims, 5 Drawing Figures

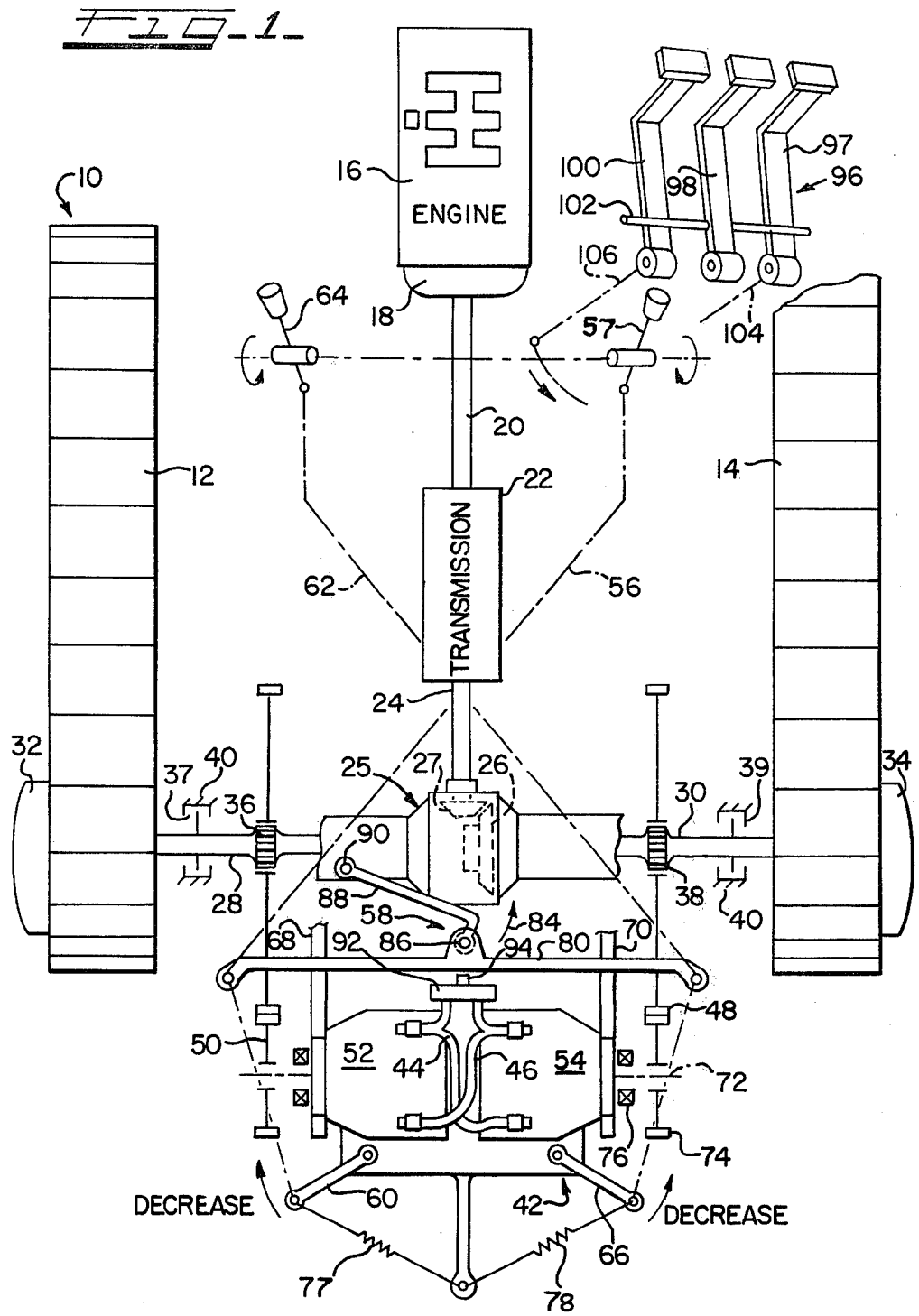

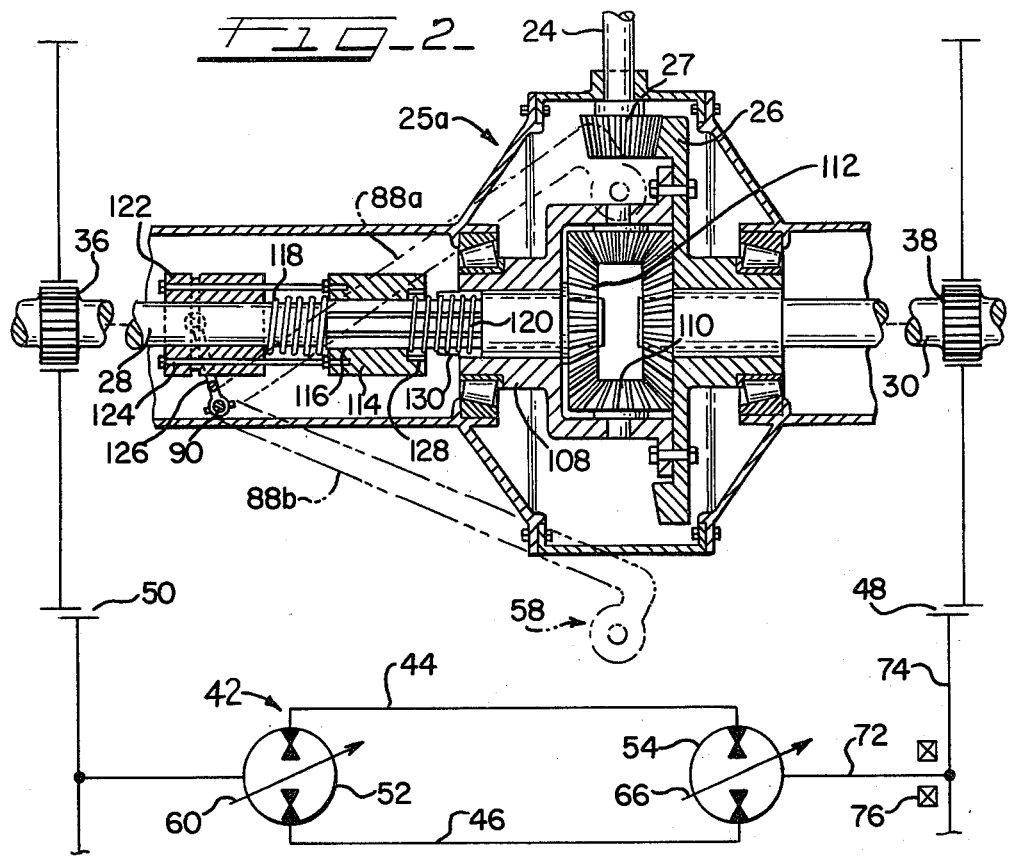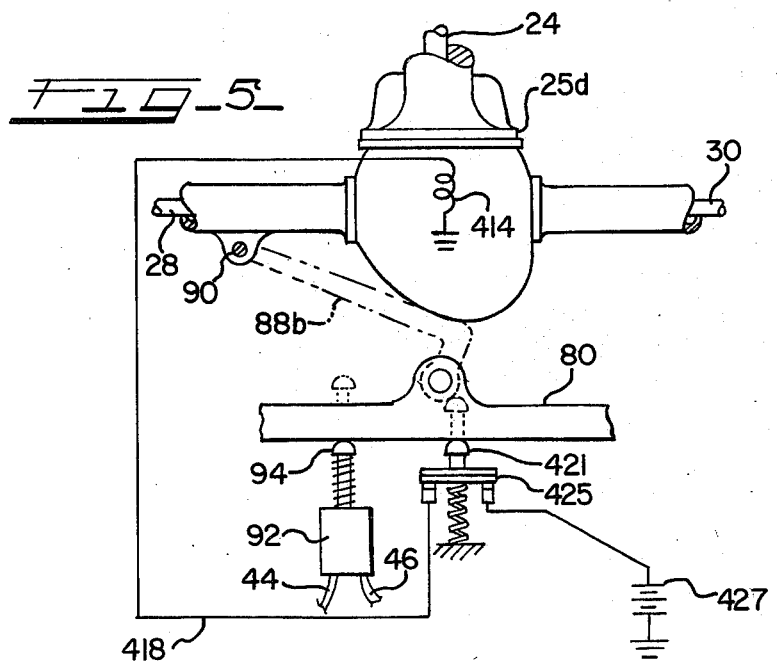

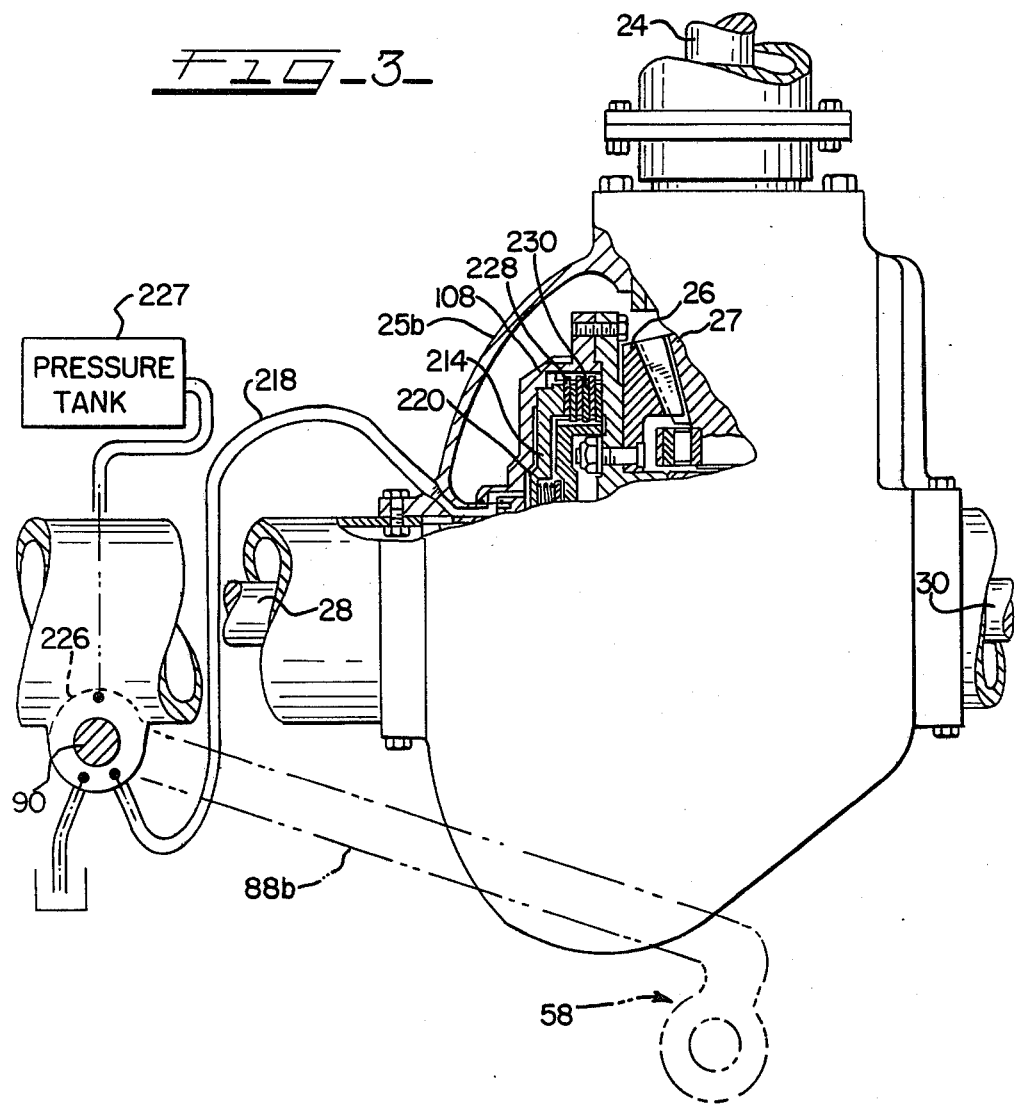

HYDROMECHANICAL STEERING DIFFERENTIAL

This application is a companion case to Horsch U.S. Ser. No. 75,788 filed Sept. 17, 1979, and owned by the same assignee.

It similarly relates to the power train adapting a crawler tractor for stepless hydromechanical or electromechanical steering by driving. But the similarity ceases by the overt simplification we herein achieve by providing that the power train terminate in a novel hydromechanical or electromechanical steering differential delivering its output to an oppositely extending pair of final drive axles at the respective traction driven sides of the tractor. Distinctively so, the steering differential as provided by us is forced by a differential lock in a straight line, locked, primary steering condition thereof to drive the axles at a mechanically fixed 1:1 drive ratio therebetween and, secondarily, is forced into differentialing by a variable displacement crossfeeding pair of axle-interconnecting hydrostatic pump/motor units or motor/generator units during all turns so as to selectively drive either axle at only some hydrostatically or electrically fixed reduction drive ratio to the other, up to and including a reduction in the slower axle to zero speed for pivot turns. All power for the primary and secondary drives is transmitted simply and directly by the differential itself.

This same overt simplification achieved by our invention becomes evident by inspection when certain prior disclosures are considered among the background patents, especially expired U.S. Pat. No. 2,336,911. The relevance of the patent will be noted with respect to the opposite track axles it discloses, having separate interconnections thereto connected in parallel power paths as provided first, mechanically by an interconnecting differential, and as provided second, hydraulically by a three-unit interconnecting hydrostatic bidirectional drive; the patented three-unit arrangement requires an external source of power, absent from the present self-powered invention.

Further background patents of relevance include but are not limited to U.S. Pat. Nos. 2,996,135, 2,394,119, 3,744,584, 3,815,698, 3,862,668, 4,019,596, 4,093,048, and particularly U.S. Pat. Nos. 2,336,912, 2,353,554, 2,401,628, 2,446,242 and 2,580,946.

In general, a crawler tractor has straight line steering or else it turns, the same as just mentioned and depending in all cases upon whether, relative to a reference track driven by the axle at one side, the same speed or a slower speed is being attained by the other (inside) axle driven track. According to the present invention, the novel steering differential drive in which the power train terminates is as just alluded to the sole source for powering the mechanical 1:1 drive and the sole source for powering the secondary variable ratio hydrostatic or electrical bidirectional drive as constituted by our crossfeeding pair of axle-interconnecting variable displacement hydrostatic pump/motor units or motor/generator units on all turns.

The objectives if not seen as altogether unexpected here are nevertheless not believed all obvious ones and include: utilizing dual variable displacement pump/motor units as the crossfeeding hydrostatic units added to a steering differential in parallel therewith in a self-powered manner adapting it for stepless hydrostatic/mechanical steering; doing so in that manner using small size units for each of the dual units, by reason of the fact that the differential supplies the total output whereas at most only a portion of total output is ever utilized by the hydrostatic units in superimposing the differential in speed needed between the two axles; affording a neutral steering drive mode so that the crawler when the tracks are stopped will have freedom from any tendency to creep; positively mechanically linking the tracks together for conjoint 1:1 rotation during straight line steering so that there is no steering drift; and intercommunicating the dual units with a crossfeed which is automatically bypassed or discontinued during straight line steering to insure against one unit's feed from outstripping the other and building up a substantial hydraulic back pressure to work against.

Further features, objects, and advantages will either be specifically pointed out or become apparent when, for a better understanding of the invention, reference is made to the following description, taken in conjunction with the accompanying drawings which show certain preferred embodiments thereof and in which:

FIG. 1 is a schematic diagram in top plan of an arrangement of power source, a slip drive power train, and steering differential drive in a crawler tractor embodying the present invention;

FIG. 2 is a top plan view of the steering drive including the axles, and showing the separate jaw lock differential interconnecting the axles and variable ratio hydrostatic bidirectional drive interconnecting the axles;

FIG. 3 is a view similar to FIG. 2, similarly showing a steering differential but being a differing embodiment therefrom by showing a fluid friction lock differential;

FIG. 5 is a further modified showing, with an electric lock differential illustrated.

Figure 4:
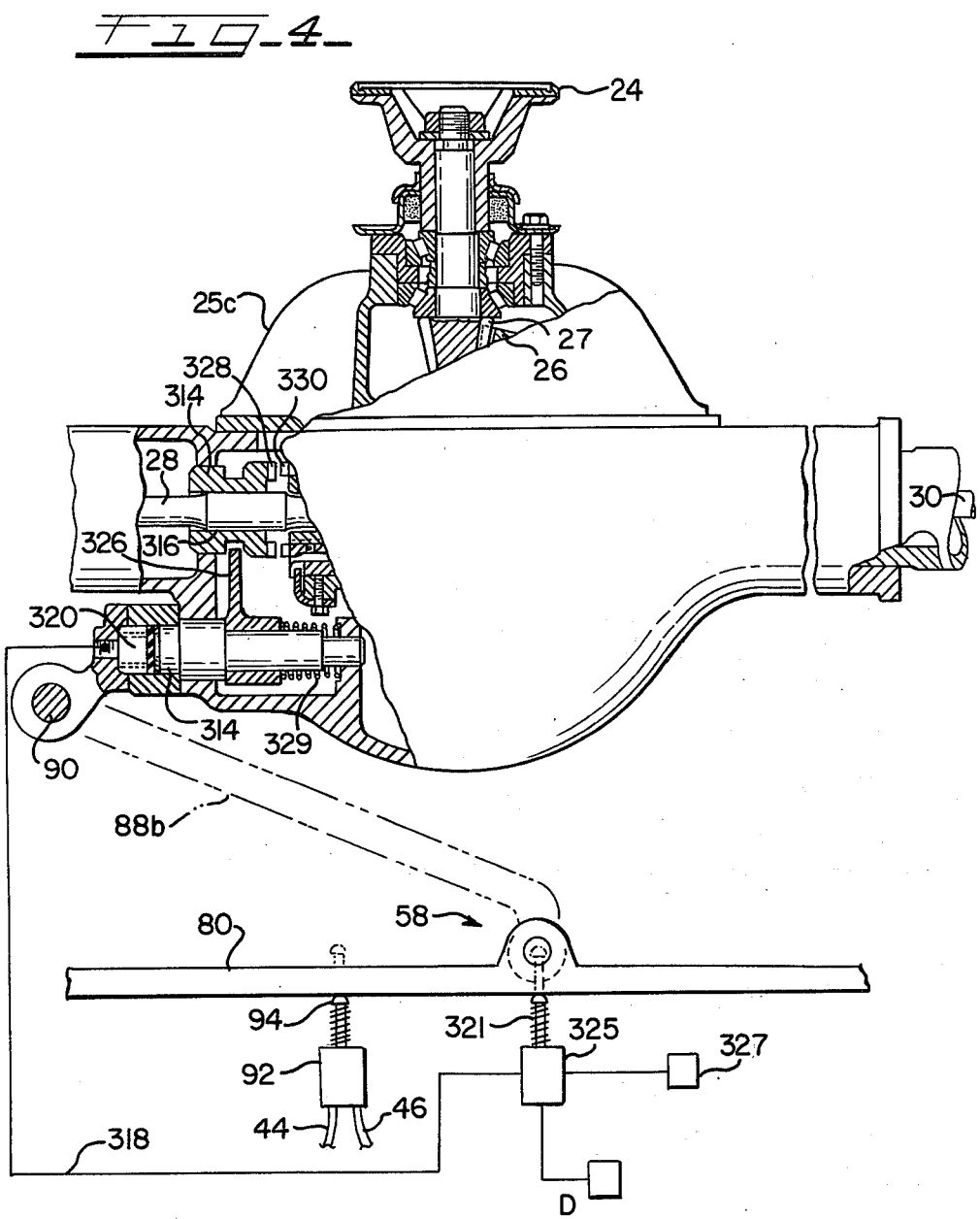
FIG. 4 is similar to FIG. 2, but is a modified showing differing therefrom with the illustration of a fluid jaw lock differential.

More particularly, in FIG. 1 of the drawings, a tractor 10 is shown having respective left and right endless crawler track assemblies 12 and 14 which are powered for steering by driving, and a forward mounted diesel engine 16 with appropriate connections for powering the tracks. Specifically, power from the engine 16 is transmitted in a slip drive path through a hydrodynamic torque converter 18, a power shift transmission input shaft 20 and reversible, change speed transmission 22, axle drive means comprising a transmission propeller shaft 24, a manual locking differential drive means 25 comprising a bevel gear 26 which is driven by a meshing pinion 27 on the propeller shaft 24, and an oppositely extending pair of controlled output axles 28 and 30 connected by respective left and right final reduction gearing 32 and 34 to the corresponding track assemblies 12 and 14.

A spline 36 and a spline 38 on the respective output axles 28 and 30 are included in a path to be described providing secondary control over the axles 28 and 30 in accomplishing steering by driving.

Hydraulically operated power brakes 37 and 39 provide tertiary control over the axles by set brake or drag brake action with respect to the fixed tractor steering housing 40 for frictionally independently arresting axle motion.

The secondary control over the axles 28 and 30 is provided by a variable ratio, dual unit, bidirectional drive 42 having crossfeed connections 44 and 46 for energy interchange between units, and having pinion and gear speed reduction gearing 48 and 50 fast to the respective axle splines 36 and 38 so as to interconnect axles.

Because a reduced speed drive at fixed ratio can be afforded by the bidirectional drive 42 as from, for example, the pinion and gear reduction gearing 48 to the opposite pinion and gear reduction gearing 50, it will be apparent in the steering drive arrangement, if properly controlled, that so long as the differential drive means 25 rotates under power it will drive the gearing 50 and associated axle 28 at a fixed reduced speed ratio for steering the tractor in a turn about the reduced speed track side which is to the left as viewed in FIG. 1. Also, with no help from the bidirectional drive 42, the manual lock, not shown, on the differential drive means 25 will in its set engagement make the differential drive means 25 cause straight line steering of the tractor 10 because of the 1:1 locked connection of the two axles 28 and 30 to one another.

Basic to the just alluded to, dual unit, bidirectional drive now to be explained, is that the dual units, in order to provide the drive both ways, have the mutual capability inherently for each to be run as a motor when the power to be consumed is transferring from the other unit, and to operate as the generator when delivery of the operating power is to the other unit.

BIDIRECTIONAL DRIVE 42—FIG. 1

Generally for purposes of drive 42, any conventional units can be employed wherein each of the two units is broadly a generator/motor. The crossfeed by energy interchange will in a larger sense be fluid current or electrical current between the two generator/motor units. And an interchange of the latter current at fixed shaft to shaft speed reduction ratios is accomplishable readily within the skill of the electrical arts in their present state of refinement. Selsyn generator/motors are suitable in such electrical applications, or other appropriate dynamos which are available on the market in stock or to order. So what more basically is involved is variable excitation or equivalent of the units to adjust the relative speed/output of each, whereby that unit with the relatively unchanged excitation or equivalent will operate slower so as to run the associated axle at fixed speed reduction ratio relative to the other unit and its axle. Automatically interrupting both excitations lets both units freely accommodate to straight line steering with the axles mechanically locked together.

It is found to be of a particular advantage herein that each generator/motor unit be a fluid-driving pump/fluid-driven motor unit. Therefore it will be an incompressible medium which flows as the crossfed current. So the respective dual left and right units illustrated at 52 and 54 are preferably positive displacement, hydraulic pump/motor units, with direct interdependence between their rotational speeds and the transmitted quantity of the incompressible hydraulic fluid, such as oil.

Although a tilting head pump/motor unit will be equally effective for the unit 52 and for the unit 54, an axial piston, swash plate type pump/motor is shown in each instance which is operable in two quadrant operation, i.e., as a motor and as a pump and which because of the reversible transmission 22 is so operable in both of its directions of being rotated. Not only therefore is the capability of units 52 and 54 comparable with fixed displacement units each operable in both senses of rotation, either as a pump or as a motor, but also their delivery rate is adjustable because of the variable excitation availed from the positive displacement pump strokes which can be constantly changed in a single quadrant from zero to maximum by varying the setting angle of the swash plate of each in known manner.

One or generally both units 52 and 54 whenever there is any axle motion, and also one and generally both axles 28 and 30, turn whenever the differential drive means 25 is being rotated. One or generally both units 52 and 54 are consequently assured of continuous drive and continuous effectiveness while the tractor 10 is being driven.

A so-called right steering linkage 56 is operated at its front end by a conventional right steering lever 57. The linkage 56 operates at the rear through a two link actuator mechanism 58 to set a left unit stroke control lever 60 counterclockwise as viewed in FIG. 1 to a rearwardmost "home" position in which the servo, not shown, controlling the swash plate concerned causes the latter to set the axial pistons of the left unit 52 at full stroke for maximum positive pumping displacement. A left steering linkage 62 is similarly operated at its front end by a left steering lever 64. Also, the linkage 62 operates through the two link actuator mechanism 58 which, at the rear thereof, sets a right unit stroke control lever 66 clockwise as viewed in FIG. 1 to its rearwardmost "home" position for appropriate operation of the servo to set maximum stroke displacement.

It is intentionally done in the explicit situation here to have the steering lever at each side of the vehicle connected to the pump/motor unit at the diagonally opposite side, and so the steering linkages 56, 62 are deliberately shown to criss-cross diagonally in the vehicle.

The left and right units 52 and 54 are symmetrically identical, and have the same size, same speed capability, and same displacement. The units hydraulically intercommunicate their liquid in the manner of an outright exchange and by the connections 44 and 46. The pair are physically in end-to-end relation, reacting primarily against one another axially rather than having their rotary thrust component directed outwardly so as individually to necessitate heavy outboard thrust bearings. For confining their outwardly acting coaxial static thrust component, the concentric units 52 and 54 are held by their casings between apertured heavy housing plates 68 and 70 and, as typified by the unit 54, its pump/motor shaft 72 is splined to the pinion 74 of the pinion and gear reduction gearing 48. The pinion 74 is journalled in rollers of a bearing 76 carried by a tubular flange extension, not shown, welded to the adjacent heavy housing plate 70.

The units 52 and 54 in their end-to-end arrangement illustrated are of the type as generally shown in said companion Horsch U.S. application Ser. No. 75,788, the disclosure of which is incorporated in entirety herein by reference.

In the description to follow of our secondary drive for making hydrostatic turns, a convenient means of differentiation to be kept in mind is that the variable displacement pump/motor unit with the greater displacement goes slower, because for each revolution thereof the companion unit with the lesser displacement must turn more than one revolution in order to positively displace commensurate liquid in their exchange. In the extreme the latter, when set for zero stroke, freewheels for an infinite number of revolutions without loading the output and with no displacement of liquid whatever.

HYDROSTATIC TURNS BY SECONDARY DRIVE—FIG. 1

Up to and at the point at which this secondary control function will be initiated, controls for the bidirectional drive 42 reside in a solid line home position as shown in FIG. 1 wherein the units 52 and 54 rotate at the same speed and in the same direction and wherein their displacements are at maximum. Maximum displacement in the units is due to full stroke as set by the illustrated position of their control levers 60 and 66. The levers are so positioned by return springs for the entire linkage system (56, 62) which are illustrated for convenience as consolidated in an anchored pair of tension springs (77, 78) which jointly pull so as to bias the levers 60 and 66 to home position toward one another.

In a left turn, for example, as typified by how the cross linkage 62 as viewed at the left resets the right pump/motor unit 54, initial hand pulling of the left lever handle 64 rearwardly toward the operator will cause slight counterclockwise rotation of an actuator singletree 80 in the direction of arrow indicated at 84 so as to cause similar counterclockwise advancement of the stroke control lever 66 in the arrow-indicated decrease direction as viewed in FIG. 1. The pump/motor stroke correspondingly decreases, and the resulting decreased displacement of the right unit 54 hydraulically forces its opposite counterpart, the left unit 52, to relatively reduce its speed and the speed of the left axle 28 as controlled thereby during this secondary hydrostatic drive. The track assembly 12 to the left as viewed in FIG. 1 slows relative to the right track assembly 14 so that the vehicle 10 inherently enters into the left turn as called for.

Further pulling of the left steering lever 64 toward the operator causes the left turn to be more and more severe, i.e., the radius of turn curvature shortens. Finally, hand pulling of the left lever handle 64 full rearwardly causes the right unit stroke control lever 66 to adjust the servo of the right unit 54 for zero displacement, hydraulically locking the left unit 52 for a so-called pivot turn about the stopped track 12 on the left as viewed in FIG. 1. Release of the left lever handle 64 allows the spring 78 to restore the linkage 62 so that the steering linkages 62 and 56 at both sides occupy their home position.

A turn can similarly be executed to the right by the operator pulling the right lever handle 57 toward himself to varying degrees for graduality or severity of turn up to a pivot turn as desired. Throughout the latter turn, about the stopped track 14, the opposite pump/motor unit 52 is set for accommodating infinite pump/motor speed of rotation at zero displacement with no flow in or out, while the adjacent unit 54 at the right remains set for full stroke displacement in the pump 1 motor thereby being hydraulically locked against rotation due to flow stagnation caused by the opposite unit 52. So all of the differential's drive is consumed in the output axle 28 with none consumed in the output axle 30 to which the hydraulically locked right unit 54 is drivingly connected. The sole portion of output absorbed by the freewheeling unit 52 will be the power thereto consumed as friction losses.

A pivot connection 86 supports the actuator singletree 80 on a lock actuator arm 88 which is supported above the drive means 25 by an arm shaft 90 upstanding therefrom.

The preferred operation is that, at any given time, only one of the handles 64 and 57 is disturbed out of its home position. At that time, one of the units 52 or 54 will be operating at full displacement for full hydraulic effectiveness. And yet whichever unit is driving—the full displacement unit or the other one—will be transmitting only a share of the steering-by-driving power; the main driving power will be coming from the differential drive means 25 so that the dual units 52 and 54 may therefore be smaller dimensioned and of much lower capacity than found in all-hydrostatic or all-electric dual path drive systems in which the units must be sized to transmit full traction power rather than just a share as required herein.

Should the operator pull the handles of the levers 64 and 57 full rearwardly toward himself at the same time, each of the units 52 and 54 will in effect idle or free wheel with zero displacement, zero stroke, and zero output, thus having no influence on the differential means 25 no matter whether the terrain attempts to hold the tractor 10 in straight line movement or turning movement.

STRAIGHT LINE CONDITION OF SECONDARY DRIVE—FIG. 1

Because as a practical matter the hydrostatic units 52 and 54 will not have identical outputs even though rotating in a common direction at full stroke displacement under identical speeds, they have a plunger operated bypass valve 92 provided between their interconnections 44 and 46. Therefore when, upon completion of a turn, the actuator singletree 80 is restored to its home position as shown in solid lines in this figure, it depresses the bypass valve plunger 94 so that the previously closed valve 92 activates by reopening for straight line steering. The open valve 92 insures zero pressure circulation by bypassing the one unit which might tend to operate as a motor and so the other of the units 52 or 54 as and if acting as a pump cannot build up pressure.

BRAKED TURNS BY TERTIARY DRIVE—FIG. 1

Our design allows us to use a standard tractor brake pedal assembly 96 to special advantage. The assembly includes a right pedal 97, a parking brake pedal 98, and a left brake pedal 100 as viewed in this figure.

The parking brake pedal 98, also serving as a service brake, is effective to depress not only the right brake pedal 97 but also the left brake pedal 100. A cross rod 102 carried by the parking brake pedal 98 is schematically shown to overlie the other pedals for their coordinate depression with pedal 98.

The right pedal 97 has a right valve connection 104 and the left pedal 100 has a left valve connection 106 by which the pedals, from selective foot pressure by the operator, independently apply or release pressure from and to the axle brake cylinders of the respective hydraulically operated power brakes 37 and 39. Depression of the left pedal 100 pivots the valve connection 106 in the direction of the arrow shown, to engage the left brake 37.

In an emergency resulting from failure of the bidirectional drive 42 hydrostatically, or else mechanically such as by defective reduction gearing 48 or 50, a mode of steering brake control can be inaugurated by selective operation of the left and right brake pedals 100 and 97. So at each side of the vehicle, the operator can manually maintain a set brake or drag brake operation, and thus straight line driving can be accomplished and steering up to and including pivot braking can be accomplished in the emergency.

REVERSE SETTING OF TRANSMISSION 22—FIG. 1

The steering remains consistent, being the same for rearward motion of the vehicle 10 as for forward motion and as determined by the setting of the transmission 22. Whenever the transmission is operating in reverse, either of the two things—pulling the right lever 57 or, with hydraulic drive failure, depressing the right brake pedal 97 and pulling the right steering lever 57—immediately causes further slip of the converter 18 and slowdown of the right track 14 so as to execute a right turn rearwardly. Whenever the transmission 22 is operating in the forward settings, either of the same two things will cause increased slip of the converter 18 and slowdown of the right track 14, so that the faster left track 12 on the outside will cause a forward turn to the right.

One of the more commercially attractive features of our invention is that, through the addition of a hydrostatic pair of variable displacement pump/motor units and controls including appropriate steering linkages, a commercial locking differential drive for tractors can easily be transformed in production from strict mechanical operation to bi-directional, infinitely variable, self-powered hydromechanical operation. And, only in the emergency already noted of hydrostatic drive failure, will the strict brake steering control by employed. Such a differential transformable in accordance with the principles of our hydromechanical steering invention can be of the manual jaw lock differential type for tractors as generally shown in expired U.S. Pat. No. 2,304,914, which is now to be explained and the disclosure of which is incorporated in entirety herein by reference.

MANUAL JAW LOCK DIFFERENTIAL 25a—FIG. 2

Briefly as compared to the unpivoted broken line position 88b thereof, in all of the pivoted positions of the actuator arm 88, e.g., its extreme forward position as indicated by the broken lines 88a such as will be caused by pulling the handles of both steering levers, not shown, to their rearwardmost position, this specific patented jaw lock differential individualistically identified at 25a will stay unlocked as seen in the showing thereof in this figure of drawing. Specifically, the power train drive therefore follows the path including the propeller shaft 24, pinion 27, gear 26, differential case 108, and orbiting pinions 110, whence the side gears 112 carried by the axles 28 and 30 divide the torque therebetween by differentialing as required.

Differential lock up, resulting each time the arm is restored to its unpivoted or home position as shown by the broken lines 88b, causes straight line steering of the vehicle with the output axles 28 and 30 rotating in the same direction at a fixed 1:1 speed ratio. As specifically provided for the purpose, a clutch sleeve 114 is nonrotatably carried on splines 116 on the axle 28, and axially floats on the latter because it is trapped between a helical engaging spring 118 and a helical clutch release spring 120. The latter clutch release spring 120 reacts in effect against the differential case 108 whereas the clutch engaging spring 118 abuts against a fork collar 122. The collar 122 makes a lost motion connection to the clutch sleeve 114 by means of long relatively slidable bolts 124 passed therethrough whereby the collar is axially slideable but relatively nonrotatable to the axle 28 received within the collar and sleeve 114.

When the pivoted arm is restored to the unpivoted broken line position 88b, it turns the supporting shaft 90 and a pivoting clutch fork 126 affixed thereon so as to collapse the springs 118 and 120. Complementary jaw clutch teeth 128 and 130 which are shallow and slightly beveled and which are carried by the respective clutch sleeve 114 and differential case 108 then go into engagement, either immediately if the teeth are already registering or upon initial relative rotation bringing them into complementary registry. No further relative rotation of the case 108 and side gears 112 can occur within the differential, and hence lock-up and the straight line steering are accomplished with no differentialing permitted.

The springs 118 and 120 re-separate the case 108, sleeve 114, and collar 122 and thus disengages the meshing teeth 128, 130 immediately the arm pivots out out of its unpivoted, broken line position 88b. So the described differentialing is restored, and the cycle can thereafter be repeated.

When the controls 60 and 66 are unequally set for making a turn with the dual unit bidirectional drive 42, the bidirectional energy flow can rapidly reverse the various changes of terrain encountered. As an example, a track being powered on the outside of a (right) turn by the left generator/motor unit 52 acting as motor can crest on a slight hump and, in going along the down side thereof, can momentarily start driving the outside unit 52 as a generator so that the energy transfer direction through the motive fluid crossfeed 44, 46 is no longer to the outside unit 52 but from it. However, our drive 42 automatically accommodates to this temporary transformation or any transformation whatever of either generator/motor unit's function, because the drive 42 we employ is a variable ratio, dual unit, bidirectional drive.

If instantaneous response not requiring jaw synchronization is desired, our invention readily adapts to power locking of a differential although doing so will necessitate that some means be provided for tapping into a power source. According to the broader principles hereof, a heavy duty, off-the-road locking differential will be found suitable of the type as generally shown in expired U.S. Pat. No. 2,913,928, which will now be explained and the disclosure of which is incorporated in entirety herein by reference.

FLUID FRICTION LOCK DIFFERENTIAL 25b—FIG. 3

Briefly the actuator arm, when occupying the unpivoted position as shown by the broken lines 88b in this figure relative to the specific differential drive means 25b appearing, causes the compression together of case connected clutch disks 228 and alternating axle connected disks 230 of a clutch plate pack at a controlled rate of clutch engagement. Therefore the drive from 24, to 27, thence into 26 establishes the opposite axles 28 and 30 at a fixed 1:1 turning ratio for straight line steering.

More particularly, a rotary valve 226 carried by the axle housing so as to be controlled by the arm shaft 90 delivers fluid from a source of fluid under pressure 227 in a path so as to engage the clutch. Flow in the path is from valve 226 through an inlet-outlet clutch line 218 through the differential housing and into a chamber 220 to operate a clutch piston 214 received therein, which piston is spring opposed and which operates under the fluid pressure to compress the clutch pack described.

Any pivoted position of the actuator arm resets the rotary valve 226 so as to connect the inlet-outlet line 218 to drain D, thereby restoring differentialing in the patented differential drive means 25b.

The cycle is then repeated.

Besides the power operation of such plates for a simply engaged or firction drive, the interengaged drive is equally feasible according to the principles of our invention. A power lock differential along the lines of the latter can be used of the type as generally shown in expired U.S. Pat. No. 2,876,658, which is now to be explained and the disclosure of which is incorporated in entirety herein by reference.

FLUID JAW LOCK DIFFRENTIAL 25c—FIG. 4

Briefly, in the unpivoted position of the two-link actuator mechanism 58 as represented in this figure by the broken line arm position 88b and solid line singletree position 80, a clutch sleeve 314 will be hydraulically driven to the right as viewed in this specific differential drive means 25c so as to interengage the axle connected clutch jaws 328 and case connected clutch jaws 330. Locked together in that manner by the differential, the opposite axles 28 and 30 will therefore establish a 1:1 drive ratio therebetween for straight line steering.

Other elements of the patented differential drive means 25c are identified as follows:
Propeller Shaft 24
Differential Gear 26
Clutch Fork 326
Clutch Chamber 320
Valve Plunger 94
Valve Plunger 321
Crossfeed Connections 44,46
Pressure Source 327
Pinion 27
Axle Splines 316
Clutch Piston 314
Arm Shaft 90
Bypass Valve 92
Clutch Valve 325
Inlet-Outlet Line 318

When the two-link actuator mechanism 58 takes any pivoted position, not shown, a spring moves the bypass valve plunger 94 into the broken line position shown and a spring moves the clutch valve plunger 321 into the broken line position shown; therefore, the bypass valve 92 automatically reestablishes crossfeed in the interconnections 44 and 46, the clutch valve 325 depressurizes line 318 to drain D, and a spring 329 disengages the interengaged jaws 328 and 330 so that they are restored to the described disengaged position as shown in solid lines in FIG. 4.

The cycle is then repeated.

A magnetic clutch engaged in ordinary way is suitable for our hydromechanical steering differential operation according to the principles of the invention, and similarly suitable is an electrically actuated interengaged or positive jaw chock type which would offer the guarantee of being absolutely slip proof under extreme loads. The latter can be of the type generally as shown in expired U.S. Pat. No. 3,133,454 which is now to be explained and the disclosure of which is incorporated in entirety herein by reference, but only by way of example. The fact is that this electric clutch field, as measured by the present state of the art, has developed to a state of high refinement; one's choice of suitable electric clutch operators is extensive as judged from the abundance of issued patents of U.S. Clutch Class 192 in the electric operator subclasses thereof grouped under the general Subclass heading 84.

ELECTRIC JAW LOCK DIFFERENTIAL 25d—FIG. 5

When the actuator arm, supported on its upright pivot shaft 90, occupies its unpivoted position as shown by broken lines 88b in this figure, the singletree 80 occupies a corresponding unpivoted or home position as shown in solid lines wherein the depressed plunger 94 holds the bypass valve 92 open for accommodating straight line steering as previously described.

At the same time the depressed plunger 421 holds the contacts of a plunger switch 425 closed so as to conduct, for affording the straight line steering desired, a flow current from the vehicle source 427. The current flows from the switch by way of a conductor 418 through an electromagnet as schematically represented by a differential lockup coil 414 in the patented embodiment 25d of differential shown in this figure.

So the side gears, not shown, carried by the oppositely extending axles 28 and 30 in the differential are held by the coil magnetically chocked together by toothed interengagement. The propeller shaft 24 therefore drives the interlocked axles 28 and 30 at a 1:1 speed ratio to one another for the straight line steering sought.

Predetermined initial movement of the singletree 80 forwardly from the home position illustrated as it is swung on the forwardly pivoting arm allows the respective plungers 94 and 421 to extend into their broken line positions corresponding to a turn setting. Therefore, in all steering turn situations, the plunger operated bypass valve 92 is closed so that the pump/motor units, not shown, can fix the steering turn ratio and the circuit through conductor 418 is interrupted to deenergize differential lockup coil 414 and unlock the locking differential 25d.

If the hydraulic valve 92 in FIG. 5 is considered a bypass or off-on switch electrically interconnecting two motor/generator units in lieu of the pump/motor units described, then an all electric control system can be employed for an electromechanical steering differential operation. That is to say, instead of the steering linkages, not shown, controlling swash plates in the latter units, they will simply operate electrical controls such as suitable potentiometers and rheostats or equivalent to fix the steering turn ratio between axles 28 and 30 through operation of the pair of crossfeeding motor/generator units connected one to each axle. Here again, the cross linkage system is preferable whereby each steering lever controls electrical excitation of the generator/motor unit at the diagonally opposite side of the vehicle; but because of electrical distinctions and considerations encountered with some units suitable to provide electrical bi-directional drive, their control from an oppositely disposed steering lever is not essential and they can be controlled from sameside lever without necessity for the cross linkage system. Incremental adjustability of levers 60,66 affords infinitely variable steering ratios from 0:1 to 1:1, hence stepless steering.

Variations within the spirit and scope of the invention described are equally comprehended by the foregoing description.

What is claimed is:

1. In a vehicle steered by driving having a pair of companion hydrostatic pump/motor units (52,54) provided with adjustable stroke to vary the displacement, and a pair of oppositely extending axles drivingly associated therewith, all disposed one each at each side of the vehicle, crossfeed interconnections (44,46) effective in vehicle turns to allow each of the units by unassisted energy interchange strictly therebetween to cause the other of the units and its drivingly associated axle to operate at speed reduction ratios relative thereto, and a differential drive (25) interconnecting the axles in a power path between the axles which is mechanically in parallel with the power path between the axles afforded by said units, the improvement comprising:

wherein said differential drive is a locking differential drive means;

actuator mechanism (58) pivotable to a position causing unequal displacement between companion units whereby that one of the units aforesaid with more stroke operates slower so as to run the drivingly associated axle at fixed speed reduction ratio relative to the other unit and its axle; and means (90) responsive to pivoting of the actuator mechanism (58) to unlock the differential drive means (25).

2. In a vehicle steered by driving having a pair of companion generator/motor units (42) provided with adjustable excitation to vary the speed/output, and a pair of oppositely extending axles (28,30) drivingly associated therewith, all disposed one each at each side of the vehicle (10), crossfeed interconnections effective in vehicle turns to allow each of the units by unassisted energy interchange strictly therebetween to cause the other of the units and its drivingly associated axle to operate at speed reduction ratios relative thereto, and a differential drive (25) interconnecting the axles in a power path between the axles which is mechanically in parallel with the power path between the axles afforded by said units, the improvement comprising:

wherein said differential drive is a locking differential drive means;

actuator mechanism (58) pivotable to a position causing unequal excitation between said companion units whereby that unit with unchanged excitation operates slower so as to run the drivingly associated axle at fixed speed reduction ratio relative to the other unit and its axle;

means (94) responsive to pivoting of the actuator mechanism (58) to establish a current of energy crossfeed between units;

means (90) responsive to pivoting of the actuator mechanism (58) to unlock the differential drive means; and means (77, 78) to restore the actuator mechanism (58) to unpivoted position to restore locking, and to restore equal excitation and interrupt the crossfed current.

3. In a vehicle equipped with an axle drive shaft and steered by driving:

an oppositely extending pair of axles (28, 30) at the sides thereof;

an electrical bidirectional drive (42) comprising variably excitation set, generator/motor units at the vehicle sides and interconnecting the axles, for their secondary drive at speed reduction ratios fixed according to the comparative excitation settings; and for their primary drive, a driving, locking differential means (25) interconnecting the axle drive shaft constantly with both axles and which, when locked, insures a 1:1 speed ratio between axles for mechanical straight line steering and which, when unlocked, differentials as it drives both axles so as to accommodate a speed reduction ratio between axles for secondary electrical steering drive in dependence on the variable excitation set.

4. In a vehicle equipped with an axle drive shaft and steered by driving:

an oppositely extending pair of axles (28, 30) at the sides thereof;

a hydrostatic bidirectional drive comprising variably displacement set, pump/motor units (52, 54) also at the vehicle sides and interconnecting the axles, for their secondary drive at speed reduction ratios fixed according to the displacement settings (60,66); and for their primary drive, a driving, locking differential means (25) interconnecting the axle drive shaft constantly with both axles and which, when locked, insures a 1:1 speed ratio between axles for mechanical straight line steering and which, when unlocked, differentials as it drives both axles so as to accommodate a speed reduction ratio between axles for secondary hydrostatic steering drive in dependence on the variable displacement set.

5. The invention of claim 4 characterized, tertiarily so, by:

individual axle brakes (37, 39) effective to establish cooperation, during differentialing, with the differential means on different ones of the axles for emergency control, during secondary steering drive failure, with all-mechanical steering by driving.

6. A vehicle equipped with an axle drive shaft and steered by driving having:

a pair of axles (28, 30) disposed respectively at the opposite sides thereof;

a pair of likewise disposed, companion generator/motor units (42) provided with variable excitation settings to vary the speed/output, and with interruptable electrical crossfeed interconnections effective in vehicle turns when not interrupted to allow each of the units by unassisted energy interchange strictly therebetween to cause the other of the units to operate at speed reduction ratios relative thereto, the aforesaid units at the respective sides of the vehicle each drivingly connected to the one of the axles disposed at that side, for their secondary drive at speed reduction ratios therebetween fixed according to the comparative excitation settings; and, for their primary drive, a driving, locking differential means (25) interconnecting the axle drive shaft constantly with both axles and which automatically locks when the crossfeed is interrupted to insure a 1:1 speed ratio fixed between axles during primary drive, and which automatically unlocks during crossfeeding for differentialing to accommodate all speed reduction ratios fixed between axles for their secondary electrical drive in dependence on the variable excitation set.

7. A vehicle equipped with an axle drive shaft and steered by driving having:

a pair of oppositely extending axles (28, 30) disposed one at each side thereof;

a pair of likewise disposed, variable displacement set, hydrostatic pump/motor units (52, 54) adapted therebetween with a bypassable hydraulic crossfeed crossfeeding to interchange their hydraulic fluid when not bypassed, and each drivingly connected to the one of the said axles disposed at that side, for their secondary drive at speed reduction ratios fixed according to the displacement settings; and, for their primary drive, a driving, locking differential means (25) interconnecting the axle drive shaft constantly with both axles and which automatically locks when the crossfeed is bypassing to insure a 1:1 speed ratio fixed between axles during primary drive, and which automatically unlocks during crossfeeding for differentialing to accommodate all speed reduction ratios fixed between axles for their secondary hydrostatic drive in dependence on the variable displacement set.

8. The invention of claim 7, characterized by:
a steering linkage actuator (58) common to bypassing means (94) on the crossfeed and locking means (90) on the differential means to lock the latter in the described way when the crossfeed is bypassing, and vice versa.

9. A vehicle equipped with a power drive shaft and steered by driving having:
a pair of traction drive outputs (28, 30) disposed one at each side of the vehicle;
a pair of hydrostatic likewise disposed variable displacement pump/motor units (52, 54) adapted therebetween with a bypassable hydraulic crossfeed (44, 46) to interchange their fluid when not bypassed and each drivingly connected to the one of the outputs at that side, for their secondary drive; and, for their primary drive,
a locking differential (25) interconnecting the power drive shaft constantly with both outputs through continuous gearing to each; and
turning and straight line steering mechanism (58) connected to the locking differential and to the bypassable hydraulic crossfeed, effective to lock the differential and bypass the crossfeed when steering straight line and to unlock the differential and not bypass the crossfeed when steering on turns.

10. The invention of claim 9, the connection between the steering mechanism and the locking differential being hydraulic for actuating the clutch piston (214, 314) of a fluid lock differential and characterized by:
a valve (226, 325) operated by such steering mechanism having high pressure and low pressure connections;
a fluid lock differential having a clutch piston; and
an inlet-outlet clutch piston line (218, 318) between the valve and clutch piston of the fluid lock differential, selectively pressurized to introduce high pressure from the valve as clutch engagement pressure thereto, and to reduce said pressure to the low pressure.

11. The invention of claim 10 further characterized by:
a friction clutch (228, 230) which is operated by the clutch piston and by which said differential is fluid locked.

12. A vehicle steered by driving having:
pairs of steering levers (57, 64), traction drive outputs (28, 30), and variable displacement set hydrostatic pump/motor units (52, 54), all disposed one at each side of the vehicle, the units adapted therebetween with crossfeed connections (44, 46) to interchange their fluid and each drivingly connected to the one of the outputs at that side, for their secondary drive; and, for their primary drive,
lockable differential drive means (25) interconnecting the outputs;
each steering lever at the side of the vehicle connected (56, 62) in common to the pump/motor unit at the opposite side and to the lockable differential drive lock so that, coordinately with predetermined initial and further steering movement, such lever immediately unlocks the lockable differential drive means and progressively decreasingly varies its pump/motor unit displacement so that as a motor/pump it will progressively reduce speed of the other unit acting as speed reduction pump/motor.

13. The invention of claim 12, characterized by:
bypass means (94) actuable to bypass said crossfeed connections; and
an actuator (80) common to the steering levers to actuate the bypass means automatically when either lever relocks the lockable differential drive means, and vice versa, whereby differential drive means relocking interrupts the crossfeeding, and crossfeeding interrupts locking of the lockable differential drive means.

14. A vehicle steered by driving in accordance with claim 12, further having:
hydrodynamic transmission means (18) providing a fluid slip drive output and having said lockable differential drive means connected in the output, inherently effective with increasing slip in the output to cause speed of the lockable differential drive means to decrease automatically under the higher torque requirements of turns.

15. In the mode of steering a vehicle by driving, said vehicle have a pair of companion generator/motor units (42) provided with adjustable excitation to vary the speed/output, and a pair of oppositely extending axles (28, 30) drivingly associated therewith, all disposed one each at each side of the vehicle, crossfeed interconnections effective in vehicle turns to allow each of the units by unassisted energy interchange strictly therebetween to cause the other of the units and its drivingly associated axle to operate at speed reduction ratios relative thereto, and an interposed locking differential common to the axles for mechanically driving same in a power path between the axles which is mechanically in parallel with the power path between the axles afforded by said units, the steps for steering the vehicle on a turn comprising:
selectively changing the excitation of a first one of the units so that, due to their unequal speed/output resulting, the companion unit retaining unchanged excitation operates slower so as to run the associated axle at fixed speed reduction ratio relative to the first unit and its axle; and
unlocking the locking differential (25) to accommodate the resulting steering-by-driving turn.

16. In the mode of steering a vehicle by driving, said vehicle having a pair of companion hydrostatic pump/motor units (52, 54) provided with adjustable stroke to vary the displacement, and a pair of oppositely extending axles (28, 30) drivingly associated therewith, all disposed one each at each side of the vehicle (10), crossfeed interconnections (44, 46) effective in vehicle turns to allow each of the units by unassisted energy interchange strictly therebetween to cause the other of the units and its drivingly associated axle to operate at speed reduction ratios relative thereto, and differential drive means (25) interconnecting the axles in a power path between the axles which is mechanically in parallel with the power path between the axles afforded by said units, and lockable for mechanically establishing a 1:1 straight line steering ratio, the steps of steering the vehicle in turns or not comprising:

selectively reducing the stroke of a first one of the units (52, 54) so that, due to their unequal displacements resulting, the companion unit retaining the full stroke operates slower so as to run the drivingly associated axle at fixed speed reduction ratio relative to the first unit and its drivingly associated axle;

unlocking the differential drive means (25) to accommodate the resulting speed differential introduced by the steering-by-driving turn; and restoring said units (52, 54) so that both are at full stroke and re-locking the differential drive means (25) so that the axles (28, 30) resume the mechanically locked 1:1 straight line steering ratio therebetween.

17. The invention of claim 16 characterized by including, at the time of restoration of full stroke at both sides and re-lock, the further step of simultaneously bypassing said interconnections (44, 46) to interrupt the crossfeed and energy interchange between units (52, 54).

18. The invention of claim 16, wherein the vehicle (10) further has a slip drive (18) power train having the differential drive means (25) connected in the output thereof and automatically affording increased slip under higher loadings encountered, and including the additional step of increasing slip in the power train under the increasing torque required by the turning vehicle so as to limit the speed of said first unit and its associated axle as so posited by the vehicle (10) to the outside of the turn.

19. In a method of skid steering a tractor (10) having a pair of traction drive outputs (28, 30) disposed one at each side thereof; a pair of hydrostatic, likewise disposed, variable displacement pump/motor units (52, 54) adapted therebetween with an hydraulic crossfeed to interchange their fluid and each drivingly connected to the one of the outputs disposed at that side, for their secondary drive at speed reduction ratios fixed according to the displacement settings; and for their primary locking drive, a drive differential (25) interconnecting the outputs; the steps of:

unlocking the locking differential;

relatively changing the setting of the units (52, 54) one to the other so that one is set for accommodating infinite pump/motor speed of rotation at zero displacement with no flow in or out, while the other is set for finite displacement in the pump/motor thereby being hydraulically locked against rotation due to flow stagnation caused by the one unit; and applying drive torque to the outputs (28, 30), through output of the differential (25) thereto being consumed in that output to which the infinitely rotatable one unit is drivingly connected with none consumed in that output to which the hydraulically locked unit is drivingly connected.

20. Crawler transmission mechanism having drive means and comprising:

a pair of positive displacement pumps connected in a closed hydraulic circuit with the inlet of the one pump connected to the outlet of the other pump, and vice versa;

a pair of half axles;

means for driving said pumps in synchronism with the pair of half axles respectively;

a differential common to the half axles providing an uninterrupted mechanical power path thereto from the drive means by a continuous gearing connection to each; and a single clutch on the differential effective to lock out the differentialling and also to unlock the differential;

said positive displacement pumps having variable strokes so as to afford relative differentialing between the half axles as each is driven uninterruptedly by its gearing connection while said differential is unlocked.

21. Crawler transmission mechanism in accordance with claim 20, further comprising:

stroke setting means to selectively adjust either pump up to and including a freewheeling setting with zero displacement for executing pivot turns with the differential.

* * * * *